United States Patent
Ulgen et al.

(10) Patent No.: US 6,272,243 B1
(45) Date of Patent: *Aug. 7, 2001

(54) METHOD AND APPARATUS FOR ENTERING CHARACTERS INTO A WRITING RECOGNIZER

(75) Inventors: Figen Ulgen; Kannan Parthasarathy, both of Palo Alto, CA (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,541

(22) Filed: Sep. 15, 1997

(51) Int. Cl.⁷ ........................................ G06K 9/00
(52) U.S. Cl. ............................ 382/187; 382/203
(58) Field of Search ........................ 382/181, 182, 382/185, 186, 187, 189, 224, 225, 226, 227, 228, 229, 230, 203; 345/23, 173, 179

(56) References Cited

U.S. PATENT DOCUMENTS

| | | | |
|---|---|---|---|
| 4,718,102 | * | 1/1988 | Crane et al. .................... 382/13 |
| 4,953,225 | * | 8/1990 | Togawa et al. ................. 382/185 |
| 5,257,074 | * | 10/1993 | Kamei ............................ 382/187 |
| 5,313,527 | * | 5/1994 | Guberman et al. ............ 382/229 |
| 5,389,745 | * | 2/1995 | Sakamoto ...................... 382/189 |
| 5,544,264 | * | 8/1996 | Bellegand et al. ............ 382/228 |
| 5,592,565 | * | 1/1997 | Shojima et al. ............... 382/185 |
| 5,675,665 | * | 10/1997 | Lyon .............................. 382/229 |
| 5,699,455 | * | 12/1997 | Arai et al. ..................... 382/189 |
| 5,734,749 | * | 3/1998 | Yamada et al. ............... 382/187 |
| 5,742,705 | * | 4/1998 | Parthsarathy ................. 382/185 |
| 5,761,538 | * | 6/1998 | Hull ............................... 382/229 |
| 5,787,197 | * | 6/1998 | Beigi et al. ................... 382/229 |
| 5,812,696 | * | 9/1998 | Arai et al. ..................... 382/185 |
| 5,835,632 | * | 11/1998 | Takasu et al. ................ 382/185 |

* cited by examiner

Primary Examiner—Matthew C. Bella
(74) Attorney, Agent, or Firm—J. Ray Wood; Romi N. Bose; Hisashi D. Watanabe

(57) ABSTRACT

The present invention provides a user interface having a plurality of user entry regions (34 and 36) Each user entry region is preferably separated into a first user entry sub-region (40) and a second user entry sub-region (42) by a visual cue (38). A first character is received in the first user entry sub-region (40) and a second character is received in the second user entry sub-region (42) to provide a unitary collection of strokes. The unitary collection of strokes is then matched as a whole against at least one character template in order to identify a desired character of a user.

8 Claims, 2 Drawing Sheets

FIG. 2

METHOD AND APPARATUS FOR ENTERING CHARACTERS INTO A WRITING RECOGNIZER

FIELD OF THE INVENTION

The present invention relates generally to a method and apparatus for entering characters into a writing recognizer, for example a Japanese writing recognizer.

BACKGROUND OF THE INVENTION

In the Japanese language, there are three different character sets: Hiragana characters, Katakana characters and Kanji characters. When writing-text in the Japanese language, small characters are written close to the large characters preceding them, especially when writing from top to bottom (as opposed to left to right in other languages). The small character is written to the lower left corner of the large character. Therefore, it is natural for a person writing in the Japanese language to expect to write the large and the small characters closely or almost together.

The current Japanese writing recognizers do not allow the small character to be written close or almost together with the large character. The current Japanese writing recognizers provide consecutive boxes for a user to enter characters. Each box can only receive one character from the user. Such a configuration results in the large and small characters written in different boxes.

Hence, a need exists to provide a Japanese writing recognizer which allows a user to write in his natural writing style with the small character closely or almost together with the large character.

BRIEF DESCRIPTION OF THE DRAWINGS

A preferred embodiment of the present invention is now described, by way of example only, with reference to the accompanying drawings in which:

FIG. 2 illustrates a Japanese syllabary chart according to the preferred embodiment of the present invention;

DETAILED DESCRIPTION OF THE DRAWINGS

The present invention provides a writing recognizer which allows a user to write in his natural writing style, for example a Japanese writing recognizer The present invention allows the user to electronically input two characters into a single user entry region (i.e., into one box). In the Japanese language, the first character is usually written larger than the second character. Such a configuration of the present invention allows the user to electronically write the small character closely or-almost together with the large character, as he would if writing the characters with a pen and paper.

Figure 1:
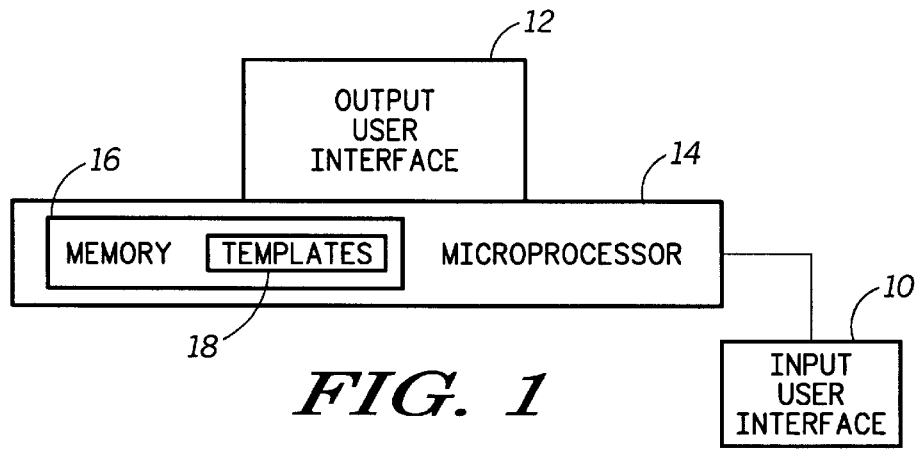
FIG. 1 illustrates an apparatus for entering characters into a writing recognizer according to the preferred embodiment of the present invention.

Referring to the drawings, FIG. 1 illustrates an apparatus for entering characters into a Japanese writing recognizer. The apparatus comprises an input user interface 10, an output user interface 12, a microprocessor 14 and a memory 16. In the preferred embodiment, the input user interface 10 is an electronic writing tablet for receiving user handwriting input and the output user interface 12 is a computer display screen. The output user interface 12 displays the user handwriting corresponding to the user handwriting input received at the input user interface 10. The microprocessor 14 is coupled to both the input user interface 10 and the output user interface 12. The memory 16 is coupled to the microprocessor 14. The memory 16 has stored thereon a plurality of templates 18 including a plurality of single character templates and a plurality of compound character templates.

Figure 2:
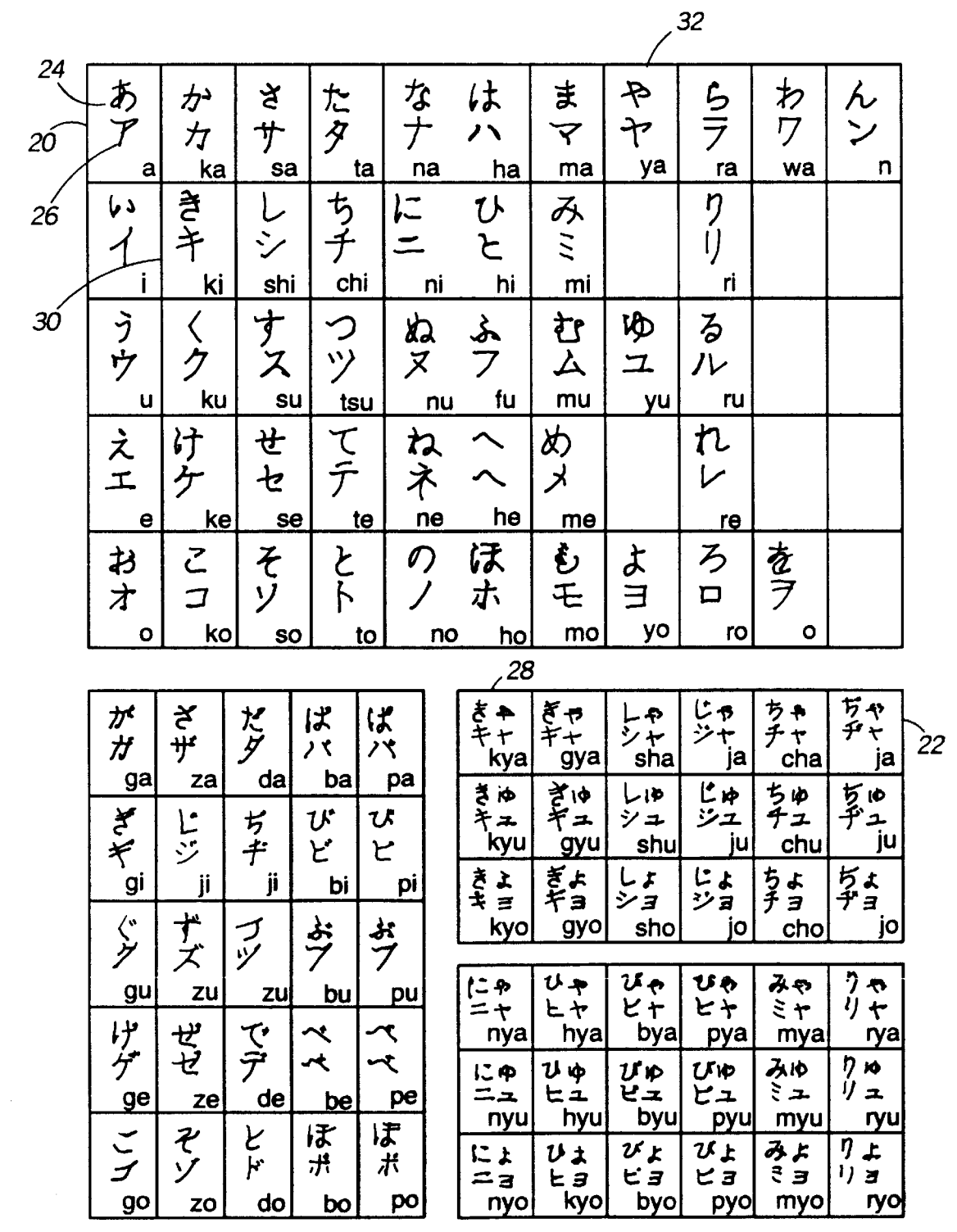

FIG. 2 illustrates a Japanese syllabary chart according to the preferred embodiment of the present invention. The Japanese syllabary chart is a set of written characters for the Japanese language, wherein each character represents a syllable. As stated previously there are three different character sets in the Japanese language: Hiragana characters, Katakana characters and Kanji characters. For each character shown in the syllabary chart, a corresponding template is provided in memory 16 thereby providing the plurality of templates 18. These templates 18 are used in a character recognizer as described in U.S. patent application Ser. No. 08/465,502, which is incorporated herein by reference. For explanation purposes, FIG. 2 is described as illustrating the templates 18 themselves. It should be noted, however, that each single character template (e.g., template 20) and each compound character template (e.g., template 22) exists separately in Hiragana character form and Katakana character form. The Hiragana character and the Katakana character templates are used in parallel in the recognition process.

Each box illustrated in FIG. 2 depicts either a single character template 20 or a compound character template 22. Purely for ease of explanation, each template depicts both a Hiragana character form and a Katakana character form. At the foot of each template is a phonetic representation (A, I, U, E, O, YA, YU and YO sounds) for illustration purposes but this plays no part in the recognition process.

For each compound character template 22 there are two corresponding single character teplates (for example, compound character template 28 comprises single character templates 30 and 32). The second single character template 32 in the compound character template 28, either in the Hiragana character form or the Katakana character form, is interpreted as a small character relative to the first single character template 30.

For example, one can collect writing samples of two characters written together to enable the type of recognition implemented by the present invention. Samples of compound character templates have been collected in boxes for the sounds KYA, KYU, KYO, ... RYA, RYU and RYO for both the Hiragana and Katakana characters. This is different from the radical-base Kanji concept because if the Kanji character enclosed as the radical portion of the compound Kanji character is used by itself, it would be considered large in size therefore becoming a completely different character. The small characters (Hiragana or Katakana) in the compound character templates 22 of the present invention, however, still maintain their size when treated as a single character template. Alternatively, one can segment two characters written in one box and match the individual characters to single character templates.

Figure 3:
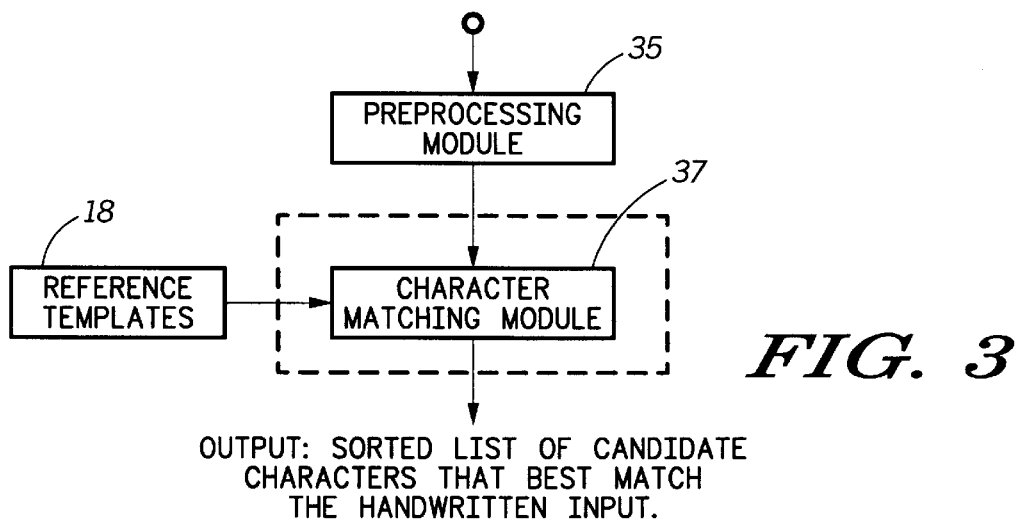
FIG. 3 illustrates a block diagram of a preferred method and apparatus according to the preferred embodiment of the present invention.

Referring now to FIG. 3, a block diagram of a preferred method and apparatus according to the preferred embodiment of the present invention. As shown in FIG. 3, a preferred embodiment of the present invention includes access to a preprocessing module 35, a character matching module 37 and a plurality of templates 18. In the preferred method and embodiment of the present invention, the character matching module 37 is operable on user handwriting input entered into the first and second user entry sub-regions to match the user handwriting input as a whole with a unitary template. The character matching module 37 correlates and compares the handwritten input to one or more templates and then provides a corresponding list of preferred candidate characters that have the highest probability of representing the original handwritten character.

In operation, the microprocessor 14 matches the plurality of templates 18. (single character templates 20 and compound character templates 22) with the characters written onto the input user interface 10 by the user. As a result, the arrangement will first display a character having the highest probability of representing the original handwritten character 44 with alternate choices 46, 48, 50 and 52 in descending order of the next highest probability.

Figure 4:
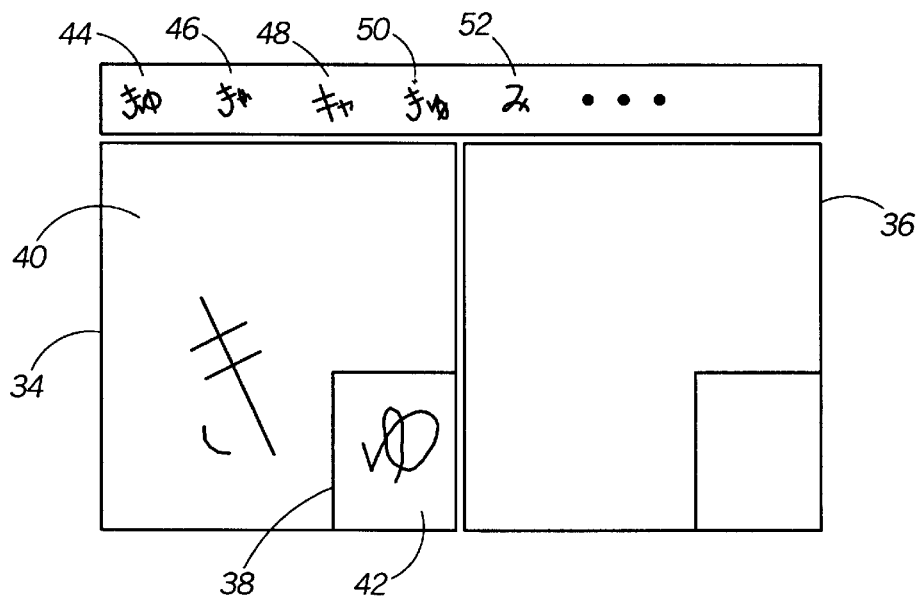
FIG. 4 illustrates an output user interface according to the preferred embodiment of the present invention.

FIG. 4 illustrates the output user interface 12 according to the preferred-embodiment of the present invention. The present invention gives the user a choice of how he would prefer to enter characters into the input user interface 10: the user can either write two characters in a single user entry region 34 or the user can write the two characters in two separate user entry regions 34 and 36.

In the preferred embodiment of the present invention, the microprocessor 14 creates a visual cue 38 on the output user interface 12. In this embodiment the user positions a pen or stylus on the writing tablet while watching the computer display screen. The user moves the pen across the writing tablet using the computer display screen as a guide. The visual cue 38 displayed on the computer display screen enables the user to judge where on the writing tablet the pen or stylus needs to be placed (i.e., the visual cue 38 guides the use where and approximately what size the small character can be written in relation to the large character). In a first alternative embodiment, the visual cue 38 is displayed on the input user interface 10 (e.g. the writing tablet). In a second alternative embodiment, visual cues are displayed on both the input user interface 10 and the output user interface 12. In a third alternative embodiment, the input user interface 10 and the output user interface 12 are the same (e.g. a writing tablet superimposed on a LCD display or a computer display screen with a digitizer input). In this third embodiment, the visual cue 38 is presented on both the input user interface 10 and the output user interface 12. The visual cue 38 divides the output user interface 12 into a plurality of user entry regions. Each user entry region is separated by the visual cue 38 into a large first user entry sub-region 40 and a small second user entry sub-region 42 in order to facilitate writing two characters in a single user entry region 34. The second user entry sub-region 42 is formed in the lower right hand corner position of the user interface relative to the first user entry sub-region 40. The visual cue 38 comprises two perpendicular lines. The two perpendicular lines can take on a variety of forms, for example, phantom lines, flashing lines, dotted lines, etc.

Alternatively, the second user entry sub-region 42 can be identified by a different shade or color than the first user entry sub-region 40. Thus, a novice user can select the visual cue 38 from a screen menu, or by any other appropriate means, to create the second user entry sub-region 42 for guidance. On the other hand, an experienced user can de-select the visual cue 38 from. the screen menu. De-selecting the visual cue 38 has no affect on the ability of the user to write two characters into a single user entry region 34.

Thus, the present invention provides a method for entering characters into a writing recognizer. The preferred method provides a user interface having a plurality of user entry regions 34 and 36, but a single user entry region 34 will suffice. Each user entry region is separated into a first user entry sub-region 40 and a second user entry sub-region 42 by a visual cue 38. A first character is received in the first user entry sub-region 40 and a second character is received in the second user entry sub-region 42. It should be noted that where the user wishes to enter a single character rather than a compound character, he can use the entire user entry region 34 without regard to (ie., writing over) the visual cue 38 if he wishes.

Each character (single or compound) is made up of a plurality of strokes to provide a unitary collection of strokes. The unitary collection of strokes is then matched as a whole against at least one of the plurality of character templates in order to identify the desired character of a user.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. The present invention is applicable to compound characters other than those having a large left-hand portion and a small right-hand portion. Moreover, the present invention can provide one or more visual cues to sub-divide the user entry region into two or more boxes or regions suited to the language in question. The visual cue can be slanted, curved or shaped as desired to aid a writer of that language. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for entering characters into a writing recognizer comprising:

providing a user interface having a plurality of user entry regions, wherein each user entry region is separated into a first user entry sub-region and a second user entry sub-region by a visual cue, the user interface configured to enable a user to enter one or more characters in a natural handwriting style including enabling a user to enter and display a compound character in a single user entry region;

receiving a compound character into a single user entry region, wherein a first portion of a compound character is received in the first user entry sub-region and a remaining portion of the compound character is received in the second user entry sub-region to provide a unitary collection of strokes, the second user entry sub-region visual cue providing guidance as to the size of the second portion of the compound character that may be entered into the second user entry sub-region; and matching the unitary collection of strokes as a whole against at least one of a plurality of character templates in order to identify a desired character of a user.

2. The method of claim 1 wherein the visual cue is user de-selectable to provide the appearance of a single user entry region to receive the first character.

3. A method for entering characters into a writing recognizer comprising:

providing a user interface having a plurality of user entry regions for receiving compound characters having a first and second portions, wherein each user entry region is separated into a first user entry sub-region and a second user entry sub-region by a visual cue, wherein the visual cue comprises two perpendicular lines and wherein the second user entry sub-region is formed as a box in a lower right hand corner position of the user interface relative to the first user entry sub-region, the second user entry sub-region visual cue providing guidance as to the size of the second portion of the compound character that may be entered into the second user entry sub-region;

receiving a compound character into a single user entry region, wherein a first portion of the compound character is received in the first user entry sub-region and a second portion of the compound character is received in the second user entry sub-region to provide a unitary collection of strokes; and matching the unitary collection of strokes as a whole against at least one of a plurality of character templates in order to identify a desired character of a user.

4. The method of claim 3 wherein the two perpendicular lines are phantom lines.

5. The method of claim 3 wherein the a two perpendicular lines are flashing lines.

6. The method of claim 3 wherein the first user entry sub-region is a different shade than the second user entry sub-region.

7. An apparatus for entering characters into a writing recognizer comprising:

an input user interface having a visual cue and a plurality of user entry regions, wherein each user entry region is separated into a first user entry sub-region and a second user entry sub-region by the visual cue, the input user interface configured to receive compound characters in a natural handwriting style wherein the interface is further configured to enable a user to enter each compound character in a single user entry region wherein a first portion of the compound character is entered into the first sub-region and a second portion of the compound character is entered into the second sub-region; and a microprocessor, coupled to the input user interface, having a character matching module operable on a user handwritten character entered into and extending across the first and second user entry sub-regions to match the handwritten character as a whole with a unitary character template.

8. A memory having stored thereon instructions and data which, when loaded into a microprocessor, cause the microprocessor to comprise:

an input for receiving user handwriting input from an input user interface;

an output, for causing user handwriting corresponding to user handwriting input received at the input user interface to be displayed on an output user interface and for causing characters recognized from the user handwriting input to be displayed on the output user interface and for creating a visual cue on the output user interface, the visual cue dividing the output user interface into a plurality of user entry regions, wherein each user entry region is separated into a first user entry sub-region and a second user entry sub-region by the visual cue, the input configured to enable entry of handwritten compound characters into the plurality of user entry regions in a natural handwriting style wherein the interface is further configured to enable a user to enter each compound character in a single user entry region; and a character matching module operable on a user handwritten character entered into and extending across the first and second user entry sub-regions to match the handwritten character as a whole with a unitary character template.

* * * * *